(12) United States Patent
Schubert (10) Patent No.: US 7,437,402 B1
(45) Date of Patent: Oct. 14, 2008

(54) LOW-POWER, HIGH-SPEED WORD COMPARATOR

(75) Inventor: Richard P. Schubert, Medfield, MA (US)

(73) Assignee: Analog Devices, Inc., Norwood, MA (US)

( * ) Notice: Subject to any disclaimer, the term of this patent is extended or adjusted under 35 U.S.C. 154(b) by 924 days.

(21) Appl. No.: 10/787,817

(22) Filed: Feb. 25, 2004

(51) Int. Cl.
*G06F 7/50* (2006.01)

(52) U.S. Cl. .................................... 708/671; 340/146.2
(58) Field of Classification Search ................. 708/671; 340/146.2
See application file for complete search history.

(56) References Cited

U.S. PATENT DOCUMENTS

| | | | | |
|---|---|---|---|---|
| 4,841,279 A | * | 6/1989 | Walters, Jr. | 340/146.2 |
| 5,391,938 A | * | 2/1995 | Hatsuda | 340/146.2 |
| 5,471,188 A | * | 11/1995 | Chappell et al. | 340/146.2 |
| 5,515,024 A | * | 5/1996 | Ghia et al. | 340/146.2 |
| 5,592,142 A | * | 1/1997 | Adams et al. | 340/146.2 |
| 5,872,467 A | * | 2/1999 | Huang | 340/146.2 |
| 6,054,918 A | * | 4/2000 | Holst | 340/146.2 |
| 6,292,818 B1 | * | 9/2001 | Winters | 708/671 |
| 2002/0149471 A1 | * | 10/2002 | Coppin | 340/146.2 |

* cited by examiner

*Primary Examiner*—Tan V. Mai
(74) *Attorney, Agent, or Firm*—Wolf, Greenfield & Sacks P.C.

(57) ABSTRACT

Apparatus and method for performing a high-speed, low-power bit-wise comparison of two digital words. For each bit, a bit comparator is shown, employing a compare node and a discharge node. After both nodes are charged, the discharge node is discharged and the condition of the compare node signals the result of the comparison. For each bit, a bit comparator is provided including a single transistor switch across the compare node and the discharge node. An exclusive-OR circuit connected to receive the corresponding bits of the words drives and selectively actuates the switch when the values of the corresponding bits are mismatched. Words may be segmented such that comparisons may be done segment-wise and the detection of a mismatch in any segment obviates the discharging of the compare node in segments containing more significant bits, to save power.

6 Claims, 7 Drawing Sheets

LOW-POWER, HIGH-SPEED WORD COMPARATOR

BACKGROUND OF INVENTION

1. Field of Invention

This invention relates to the field of digital comparators, particularly bit and word comparators such as are used to perform comparisons between pairs of addresses or data words in computing environments.

2. Discussion of Related Art

In many digital computing environments, there is a recurring need to perform "wide" (i.e., multi-bit) comparisons of two or more digital values. Often, these values represent addresses or information or instructions in a memory. Typically, the width of such values is that of a digital word in the system, and sometimes multiple words. Speed is usually important as the result of the comparison will determine subsequent processing to be performed and that processing will have to be held in abeyance until the result of the comparison is known. For example, the comparison may determine whether an addressed data block is already in a cache memory (from which fast retrieval is possible) or whether it need be fetched from a different, slower memory subsystem. Therefore, instead of performing the comparison one bit at a time, it is common practice to perform a full word comparison at one time. That is, each pair of corresponding bits is bit-wise compared and the results of the bit-wise comparisons are combined in such a way that a mismatch in any bit position will signal a mismatch at the word level.

Not only is speed an important consideration for such "word" comparators, but also in many applications, such as those involving portable computing or communications devices, so is power consumption.

Figure 1:
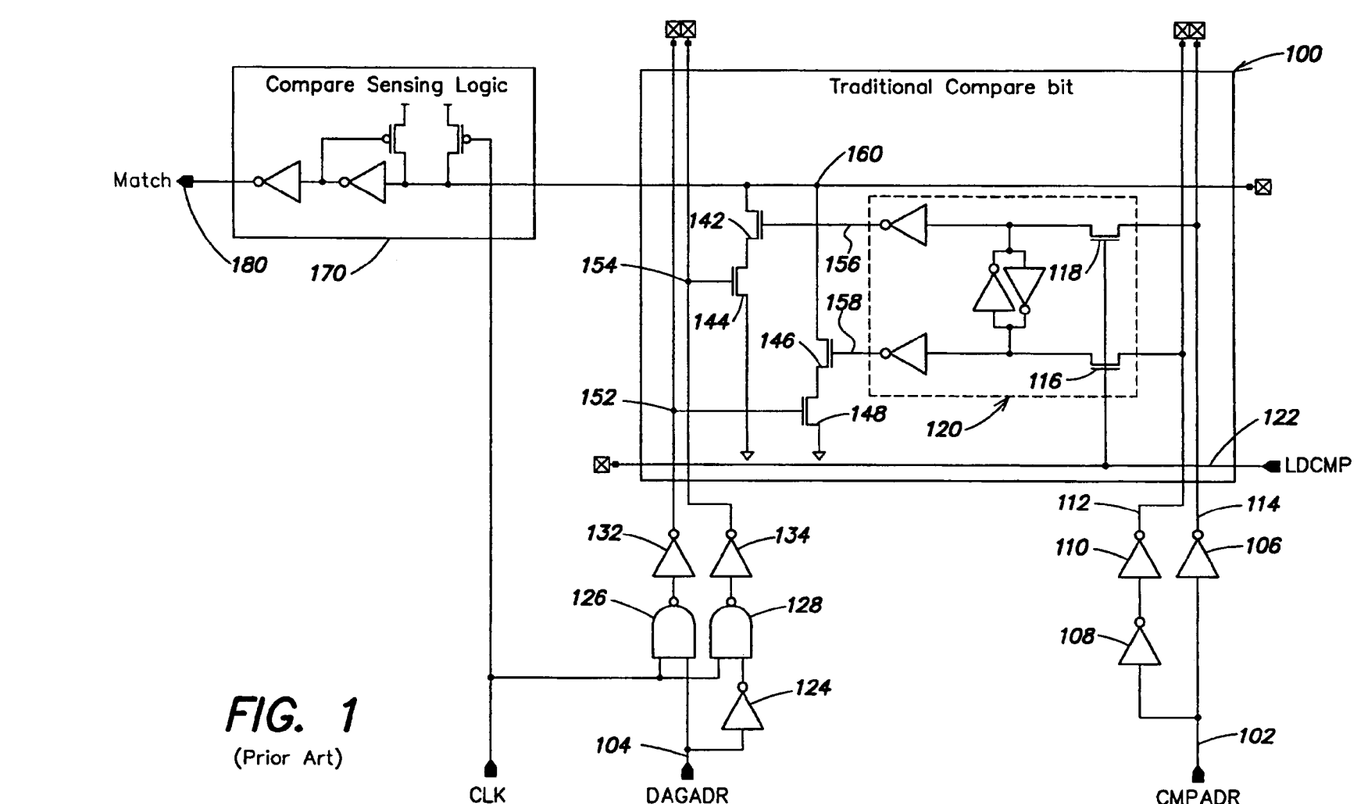
FIG. 1 is a schematic circuit diagram of one typical prior art word comparator design.

FIG. 1 depicts a typical prior art circuit 100 for performing one of the bit-wise comparisons. For purposes of providing a context, it shall be assumed that the words being compared represent addresses in a computing system memory structure, though they could have other significance (e.g., the contents of those addresses). The comparison is made between a first address (word) and a second address (word). Corresponding bits are compared one at a time, using a circuit such as 100 for each of those comparisons.

A first address bit CMPADR is received on line and a second address bit DAGADR is received on line 104. Inverters 106, 108, 110 buffer the input of the CMPADR bit and provide to the circuit 100 a true value of that bit on line 112 and a complement, or inverted, value on line 114. The sources of pass transistors 116 and 118 receive those true and complement values and their drains connect to the set and reset inputs of a strobed latch 120. The signal LDCMP applied at terminal 122 strobes the pass transistors 116 and 118 when the CMPADR address bit is in a known, reliable condition, to set or reset the latch 120.

Inverter 124 provides a complement value for the DAGADR bit and the true and complement values of the DAGADR bit are supplied to one input of each of the two NAND gates 126, 128. The other input to each of those NAND gates is a clock signal, CLK. Thus, when the CLK signal is high, the outputs of inverters 132, 134 is a buffered version of the true and complemented values of the DAGADR bit, respectively.

The four pass transistors 142, 144, 146, 148 constitute an exclusive-OR (X-OR) gate which then performs a digital differential comparison of the true and complement values on the respective nodes 152, 154 and 156, 158; if there is a mismatch, then node 160, which has been pre-charged, is pulled low. Sensing logic 170 provides a signal MATCH at node 180.

The approach of FIG. 1, while usable, exhibits certain less than ideal characteristics. For example, the comparison must be disabled while the comparison node 160 is pre-charged, imposing a speed restriction. An additional speed restriction comes from the fact that the X-OR gate comprises four transistors, having a portion of their capacitance that has to be discharged when the comparison node 160 is pulled low, and having to be charged when that node is pre-charged, where this portion is determined by the state of latch 120 and its affect on the "on/off" state of transistors 144 and 148. Further, noise margins are compromised by the fact that some nodes coupled to the comparison node 160, specifically nodes 152 and 154, will in practice not be completely pre-charged. This is due to the large amount of time required to completely pre-charge nodes 152 and 154 through their associated NMOS transistors 148 and 144, so in practice the pre-charge is typically left incomplete and chosen based on a point of diminishing return. The pre-charge on nodes 152 and 154 is also further degraded if the state held by latch 120 changes during the pre-charging of the comparison node, as this results in less time to properly pre-charge nodes 152 and 154.

Accordingly, a need exists for an improved word comparator which is capable of higher speed operation and better noise margins, and which consumes less power.

SUMMARY OF INVENTION

According to a first aspect of the invention, there is provided a digital word comparator having a plurality of bit comparators and comparison sensing logic, for comparing, bit-wise, the values of a plurality of first bits of a first word with the values of corresponding second bits of a second word. Each bit comparator includes (a) a first node and a second node and a switch connected between the first and second nodes, said switch being responsive to a bit mismatch control signal, and (b) an exclusive-OR circuit connected to receive the first bit and a corresponding second bit of the second word as inputs and having an output generating the bit mismatch control signal which selectively actuates the switch when the values of the first and second bits are mismatched. The comparison sensing logic includes a first node pre-charging circuit, a second node pre-charging circuit and a second node discharging circuit operative to discharge the second node after the first and second nodes have been pre-charged, and a logic circuit connected to sense a state of the first node to signal a bit mismatch if the bit mismatch control signal has been generated and the switch has been actuated and discharged the first node, after receiving a signal enabling operation of the logic circuit. The switch may comprise a single transistor to effect a detectable change to the first node indicative of a bit mismatch, such as a discharge of the first node.

In some embodiments, such a word comparator may further comprise the first nodes of each of the bit comparators being a same node and the second nodes of each of the bit comparators being another same node.

According to another aspect of the invention, there is shown a segmented word comparator having a first set of bit comparators, a second set of bit comparators and comparison sensing logic, for comparing, bit-wise, the values of bits in the first set and, if all the bits in the first set match, then comparing, bit-wise, the values of bits in the second set. Such a segmented word comparator comprises each bit comparator including a first node and a second node and a switch connected between the first and second nodes, said switch being responsive to a bit mismatch control signal, and an exclusive-OR circuit connected to receive the first bit and a corresponding second bit of the second word as inputs and having an output generating the bit mismatch control signal which selectively actuates the switch when the values of the first and second bits are mismatched; and all of the first nodes of the first set of bit comparators being a first same node and all of the second nodes of the first set of bit comparators being a second same node, all of the first nodes of the second set of bit comparators being a third same node and all of the second nodes of the second set of bit comparators being a fourth same node. The comparison sensing logic may include a first node pre-charging circuit for the first set of bit comparators, a second node pre-charging circuit and a second node discharging circuit for the first set of bit comparators, operative to discharge the second node of the first set of bit comparators after the first and second nodes thereof have been pre-charged, a first node pre-charging circuit for the second set of bit comparators, a second node pre-charging circuit and a second node discharging circuit for the second set of bit comparators, operative to discharge the second node of the second set of bit comparators after the first and second nodes thereof have been pre-charged; and a comparison sensing logic circuit connected to sense a state of each of the first nodes to signal a bit mismatch if the bit mismatch control signal for either set of bits has been generated and the corresponding switch has been actuated and discharged a corresponding first node, after receiving a signal enabling operation of the logic circuit.

In some embodiments of such a segmented word comparator, the comparison sensing logic includes circuitry which will not discharge the second node of the second set of bits and will not allow the first node of the second set of bits to be discharged until after circuitry in the comparison sensing logic signals that all bits of the first set of bits match.

BRIEF DESCRIPTION OF DRAWING

The accompanying drawing figures are not intended to be drawn to scale. In the figures, each identical or nearly identical component that is illustrated in various figures is represented by a like numeral. For purposes of clarity, not every component may be labeled in every drawing. In the drawing.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 2:
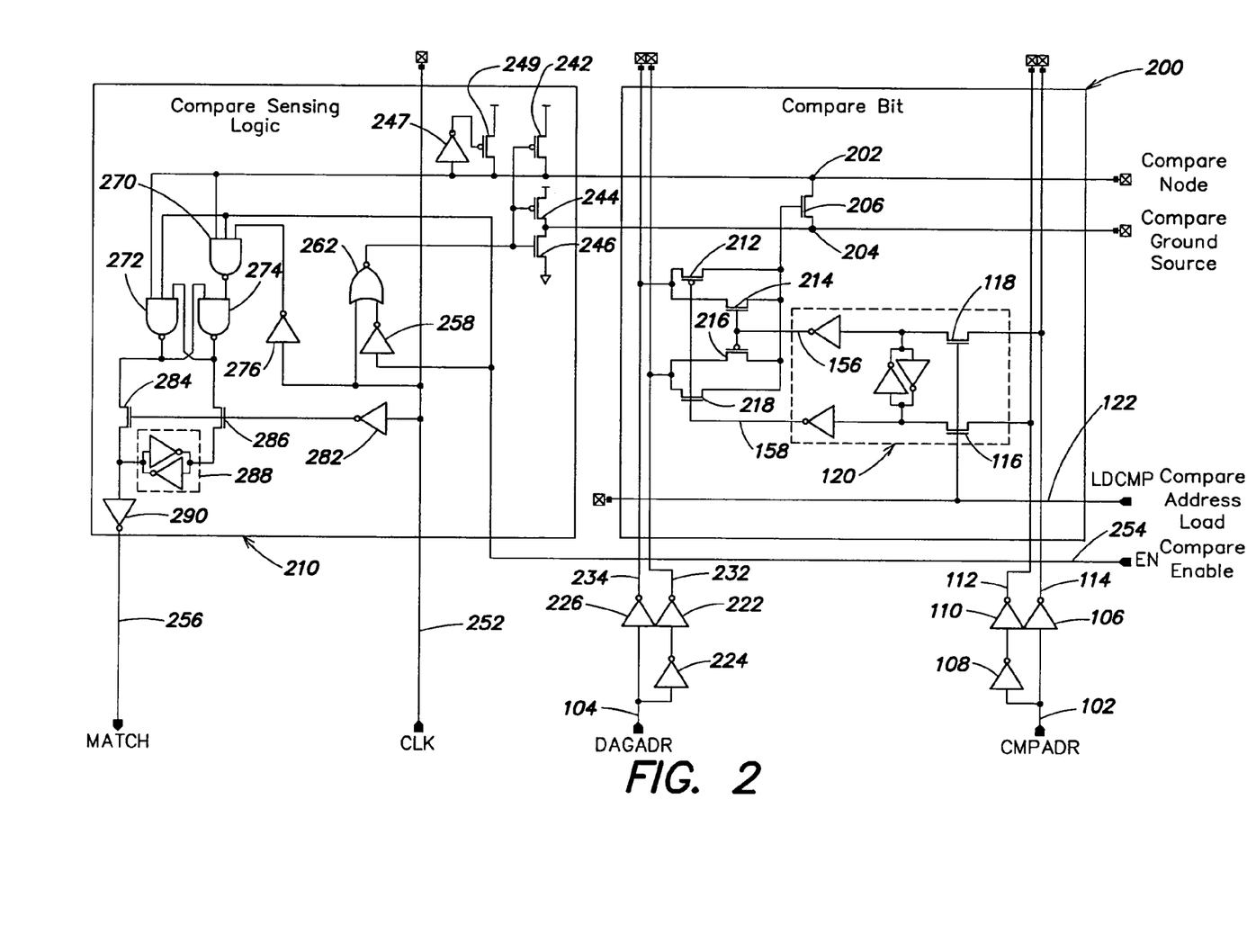
FIG. 2 is a schematic diagram of an exemplary embodiment of a single bit portion of a basic word comparator based on the inventive concepts discussed herein, employing a two-phase clock.

Turning now to FIG. 2, there is shown a schematic circuit diagram for a one-bit segment of an exemplary high-speed, low-power word comparator as taught herein. The one-bit segment comprises a bit comparator 200 and comparison sensing logic 210. Note that there will be a plurality, N, of bit comparators arrayed in parallel (where N is the number of bits in the words being compared) and sharing a common compare node 202 and compare ground source node 204; however, only one comparison sensing logic circuit 210 is needed. Components that are common to FIG. 1 are shown with the same reference numerals as were used there. Three differences will be noted relative to the bit comparator 100 of FIG. 1. First, only one pass transistor 206 is used as a switch to discharge the compare node 202. Second, the X-OR gate formed by transistors 212, 214, 216 and 218 has a different topology than the X-OR gate in FIG. 1. Thirdly, the DAGADR bit value drives the X-OR gate all the time and is not gated by the clock signal. Inverters 222, 224 and 226 supply true and complement versions of the DAGADR bit value, respectively, on lines 232 and 234, to corresponding X-OR gate inputs at the sources of transistor pairs 216, 218 and 212, 214, respectively. The outputs of latch 120, on lines 156 and 158, respectively, drive the gates of transistors 214, 216 on the one hand and transistors 212, 218, on the other.

As will be more fully explained shortly, within comparison sensing logic 210, transistors 242 and 244 are turned on to pre-charge both the compare node 202 and the compare ground source node 204. Then those two transistors are turned off and transistor 246 is turned on, pulling node 204 to ground. The condition of node 202 may then be examined at an appropriate time to learn whether transistor 206 has been turned on. Turning on transistor 206, which happens in response to a bit mismatch control signal applied to its gate from the X-OR circuitry, when there is a bit value mismatch between the CMPADR and DAGADR bits values, discharges node 202 and pulls it toward ground. Otherwise, node 202 remains charged to a high logic level.

Comparison sensing logic 210 responds to two inputs, a clock signal, CLK, supplied on line 252, and a COMPARE ENABLE signal received on line 254 (from circuitry not shown). It supplies an output signal, MATCH, on line 256, in addition to conditioning the compare node 202 and the compare ground source node 204. (Note that the node conditioning function and the node sensing functions could be decoupled and need not be carried out within the same module.) For the compare node 202, this conditioning includes a feedback circuit formed by inverter 247 and transistor 249. Transistor 249 provides a trickle current to weakly drive node 202 to the pre-charge voltage and to thereby prevent node 202 from being un-driven, and potentially leaking its pre-charge voltage over time. Such an undesired condition could occur during a compare that results in a match (all 206 transistors are off). The trickle charging circuit is formed by an inverter 247 having its input connected to node 202 and its output connected to the gate of a small pass transistor 249. Transistor 249 has its drain connected to node 202 and its source connected to a supply voltage, for supplying just enough current to keep node 202 charged, without making it difficult for transistor 206 to discharge node 202.

The COMPARE ENABLE signal on line 254 may be thought of as a quasi-static signal. Its primary purpose is to save power by blocking a compare operation from occurring at undesired times—e.g., when address data is stale or a compare operation is not needed. The COMPARE ENABLE signal also is involved in the pre-charging of the compare and compare ground source nodes. When the COMPARE ENABLE signal on line 254 is low, the output of inverter 258 is driven high and the output of NOR gate 262 is driven low. This turns off transistor 246 and turns on transistors 242 and 244, to pre-charge nodes 202 and 204 (the standby state). The MATCH signal on line 256 would otherwise not be valid at this time; if the MATCH signal is asserted, it is reset to a low value, to indicate the absence of a match. NAND gate 270 prevents either the clock signal (CLK) or the compare node 202 from triggering the cross-coupled NAND gates 272 and 274 (which together comprise a "glitch" or "bounce" eliminator) and asserting the MATCH signal.

Note that NAND gate 272 has three inputs while NAND gate 274 has two inputs. In addition to having one input tied to the output of NAND gate 274, NAND gate 272 has an input connected to node 202 and an input connected to line 254 to receive the COMPARE ENABLE signal.

When the COMPARE ENABLE signal goes low, the output of NAND gate 272 goes high (if it was low), causing the output of 274 to go high; in turn, this pulls the MATCH signal low. A differential input signal is provided to latch 288, to assure the MATCH signal changes state reliably.

When the COMPARE ENABLE signal is high, the activity that follows depends on the CLK signal. When the CLK signal falls from high to low, the output of NOR gate 262 transitions from low to high and turns on transistor 246 and turns off transistors 242 and 244. This leaves node 202 pre-charged and discharges node 204. The inverter 276 prevents the state of the compare node 202 from being interpreted by the cross-coupled NAND gates 272, 274 during pre-charging (i.e., when the CLK signal is high), and allows it to be interpreted during a compare interval (i.e., when the CLK signal is low). Inverter 276 achieves this result by controlling whether NAND gate 270 couples state information from the compare node 202 to NAND gate 274. Further, inverter 276 and NAND gate 270 provide a delay from the CLK signal similar to the delay from the CLK signal until the compare node 202 is activated for a compare operation (i.e., node 204 has been driven low), and the delay involved in driving node 202 high during pre-charging. Basically, a two-gate propagation delay is provided in all of those cases. This minimizes or eliminates false initial transitions (glitches) of the MATCH output when comparing bit values, with no delay added to the generation of the MATCH output. That is, it would be undesirable for the path through NAND gate 274 to indicate a match before the path through NAND gate 272 can indicate a mismatch. Such provision of propagation delay also protects the cross-coupled NAND gates 272 and 274 from faultily interpreting a pre-charge of the compare node as a compare match. (Note that NAND gate 272 does not need the protection provided by NAND gate 270 to NAND gate 274, by the nature of cross-coupled NAND gates being sensitive to (toggled by) low inputs only.)

Inverter 282, pass transistors 284 and 286, and latch 288 are not required in all implementations but are shown for completeness (note that pass transistors 284 and 286 could be considered as part of latch 288). When a latch 288 is used to stabilize the MATCH signal, the latch 288 is preferably driven via a pair of switch transistors 284, 286 connected between the outputs of the NAND gates 272, 274 and the latch inputs. One input node of the latch 288 is also its output node and is connected to the input of inverter 290. The MATCH signal is output from inverter 290. The switch transistors 284, 286 are controlled by a signal slightly delayed from the clock transitions. This delay may be effected via an inverter 282, as shown, or a separate signal latch control signal may be supplied to the gates of transistors 284, 286 and inverter 282 may be eliminated.

The system of FIG. 2 is superior to the system of FIG. 1 in a number of aspects. First, for a given compare node discharging (current sinking) ability of a compare bit, the per-compare-bit capacitance contribution to the compare node is lesser in FIG. 2 than in FIG. 1. This is the direct result of the implementation of the X-OR function and connection to the compare node, which has been reduced to a single transistor connection to the compare node in FIG. 2. Due to the way transistors 142, 144 and 146, 148 are series-stacked, each transistor in the FIG. 1 X-OR circuit must have twice the W/L (width to length) ratio of transistor 206 in FIG. 2 to have similar current sinking ability to that of transistor 206. (This assumes transistor 246 in FIG. 2 is sufficiently large to allow transistor 206 alone to essentially limit compare node current sinking ability.) With larger and more transistors connected to the compare node in FIG. 1, more capacitance is also present at the compare node. The circuit of FIG. 1, having more capacitance per bit for a given current sinking ability, will require yet further yet further increases to the W/L ratio of discharging transistors to discharge the compare node at the rate nominally achieved by a single smaller device in FIG. 2, taking into account also the self-loading by those transistors. The use of smaller transistors in FIG. 2 consumes less physical area, which decreases the compare node wiring length which further reduces wiring capacitance and wiring resistance, still further increasing the discharge rate. Thus, to achieve a comparable discharge rate as the apparatus of FIG. 2, an apparatus according to FIG. 1 would consume substantially more power to address substantially greater capacitance. Although there is a need to pre-charge and discharge the compare ground node 204 which is unique to comparators employing the concept which is illustrated in FIG. 2, the attendant diminution in power savings is insignificant The comparator of FIG. 2 conserves even more power relative to that of FIG. 1. as power is not wasted by idle address bits (DAGADR). In FIG. 1, the signals that couple address state must be driven low during the pre-charging of the compare node, and be reasserted to their appropriate states for the compare operation. In FIG. 2, this behavior is not needed. As a result, substantial power can be saved, as it is frequently the case that only a small subset of the address bits actually change state between compare cycles. For example, if the address is for an instruction fetch, most programs are written to avoid jumps in address due to the inefficient handling of jumps in most microprocessors, so most of the time the address will simply increment. And where there is a jump, it's usually local to the current address.

A further benefit of the system of FIG. 2 over the system of FIG. 1 is an ability to keep the compare node pre-charged and static when in a standby state (when compare operations are not required). This allows for very late decisions to do a compare operation, as the compare node is always pre-charged and ready to be used in the discharge-based compare operation, and no power is dissipated due to unnecessary compare node transitions. In the design of FIG. 1, discharges are always enabled during the compare phase, so there is always the high risk that addresses presented won't match and the compare node will be discharged, even if this compare operation isn't required. A practical application of this feature will be presented below, in connection with FIG. 4.

Another benefit is that the structure of word comparators according to the invention lends itself very well to an array: address wires can be shared while preserving all of the speed and power advantages. While designs implementing the teachings expressed herein may be more complicated than the prior art, the complexity is on the inside of the array, not brought out in the form of more control wires, etc.

Figure 3A:
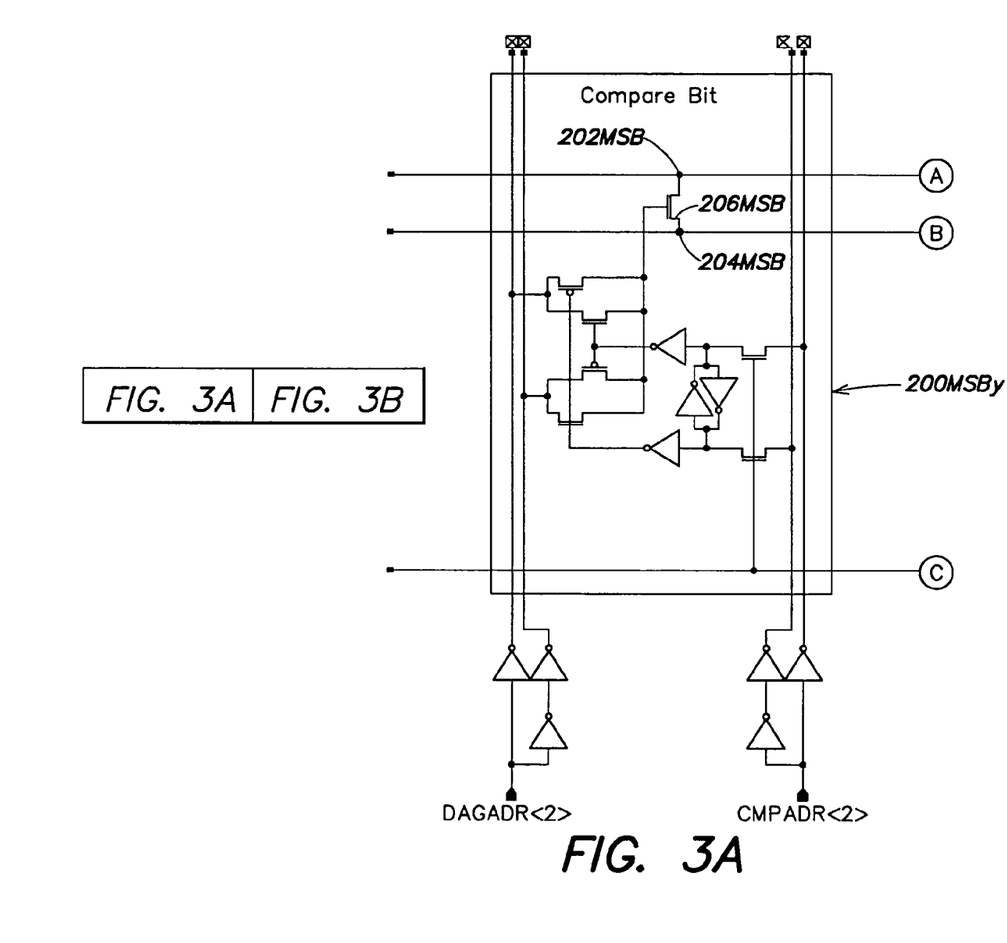
FIG. 3 is a schematic diagram of an exemplary embodiment of a basic word comparator based on the inventive concepts discussed herein, employing a two-phase clock and depicting how a word may be segmented and the word's LSBs and MSBs be compared using different compare nodes.
Figure 3B:
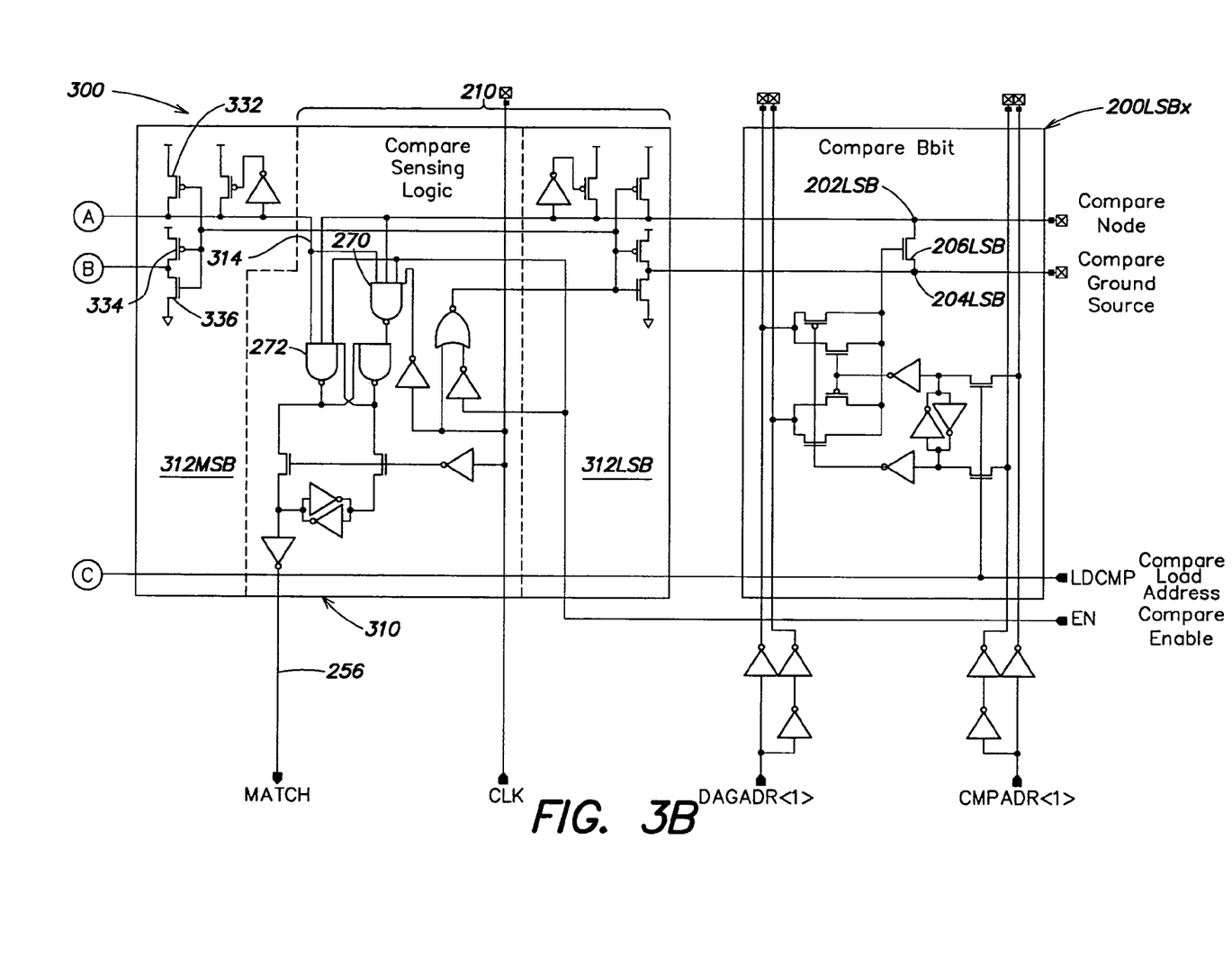

In practice, it is advantageous to segment the bits of a word into multiple subsets and to assign each subset to its own bit comparison node and compare ground source node. This reduces the number of devices on each such node, which decreases individual node capacitance, and also can reduce the physical length of a node which, in turn, decreases total individual node resistance. As the response time of a node is dependent on resistance and capacitance, splitting a node into new nodes where each has less capacitance and resistance than the original can be used to increase overall response time, provided that the merging of nodal information from all of the split nodes does not introduce more delay than is saved by the split. This approach provides higher speed and better noise margin than having all of the bits assigned to a single comparison node and compare ground source node. As shown in FIG. 3, the design of FIG. 2 readily lends itself to a segmentation of a word into a set of lower-order least significant bits (LSBs) and higher-order more or most significant bits (MSBs).

An example of a circuit 300 for effectuating this operation is shown in FIG. 3. Appropriate compare sensing logic 310 is shown in the middle of the diagram. Compare sensing logic 310 include compare sensing logic 210 of FIG. 2 augmented by an MSB compare sensing circuit 312MSB and an LSB compare sensing circuit 312LSB, which will be discussed shortly. To the right of compare sensing logic 310 is the LSB bit comparator 200LSBx for bit x, it being understood that one such bit comparator block is provided for each LSB and all such bit comparator blocks for LSBs are connected in parallel to nodes 202 and 204. To the left of compare sensing logic 310 is the MSB bit comparator 200MSBy for bit y, it being understood that one such bit comparator block is provided for each MSB and all such bit comparator blocks for MSBs are connected in parallel to nodes 202MSB and 204MSB. The division between LSBs and MSBs could be at any place in the word. So, for an N-bit word, there would be M LSBs and N-M MSBs, where $1 \leq M \leq (N-1)$; that is, there will be at least one LSB and at least one MSB. However in many cases, dividing an N-bit word into approximately equal parts is the most optimal as it divides the response times of the divided nodes into parts having equal response times, resulting in neither division being intrinsically slower than the other.

The circuitry within sub-block 312MSB of compare sensing logic 310 is precisely the same as that of sub-block 312LSB, except that it is connected to MSB compare node 202MSB and to MSB compare ground source node 202MSB. Additionally, MSB compare node 202MSB is connected to a different input of NAND gates 270 and 272 than is LSB compare node 202. So NAND gates 270, 272 independently sense the LSB and MSB compare nodes to generate a deasserted state for the MATCH signal, indicating a mismatch.

A further power savings may be obtained by combining word segmentation with use of a "three-phase" clock (i.e., one and one-half clock cycles) instead of the two-phase clock (i.e., a clock with a first, high phase and a second, low phase, completing one cycle) used in FIGS. 2 and 3. Of course, this technique is usable only when more than one clock cycle can be consumed in the word comparison operation.

According to this approach, a word is segmented into multiple parts. A first segment of the word, such as a number of contiguous least significant bits (LSBs) are first subjected to a comparison. If there is a mismatch, then no other bits need be evaluated, saving the power that additional comparisons would consume. If there is a match, then that result is passed to the next more significant segment and the compare operation is carried out on the next segment more significant part of the word. Each segment of increasingly more significant bits may be compared in sequence, if all prior segments matched, until all bits of the word have been compared. Alternatively, segmentation could proceed from MSB to LSB; that is, MSBs could be checked before LSBs. LSBs have been specified to be examined first here, in this example, due to an assumption that MSBs tend to be more static, resulting in greater risk that peak power consumption, that which occurs when the first segment(s) checked always matches, could become the norm. Making LSBs the first segment examined, assuming that LSBs are more likely to be changing, increases the likelihood that average power consumption will be reduced from such a peak. Segmentation is best chosen based on an understanding of the behavior of the applied words. If at any point a mismatch is detected, the process need not examine more significant bits, as to do so would be redundant and consume power without benefit. Of course, this methodology can be employed only if multiple clock phases can be allotted to the comparison process. In the simplest case, there would be one segment of LSBs and one segment of MSBs; the division between LSBs and MSBs could be at any place in the word. As stated above. in this situation, a three-phase clock would be used. In a first clock phase (i.e., half cycle of the clock signal), the LSB and MSB compare nodes are pre-charged. In a second clock phase, an LSB compare operation is performed. Then, in a third clock phase, if the LSB compare operation did not signal a mismatch, an MSB compare operation is performed. Alternatively, the MSB compare node may be charged after the LSB compare node is charged but before MSB bit comparison is performed.

Figure 4A:
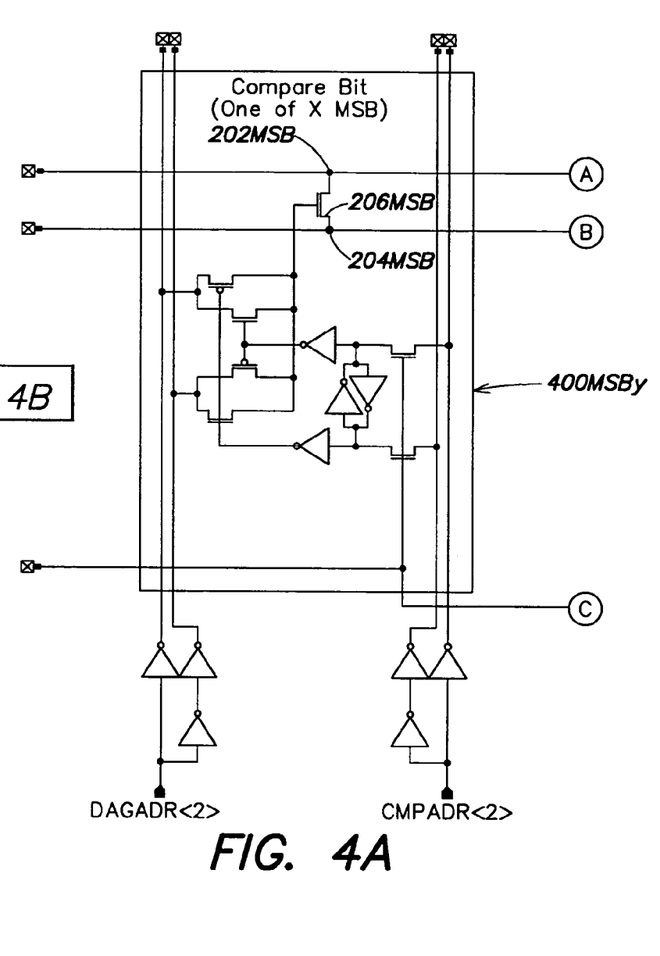
FIG. 4 is a schematic diagram of an alternative exemplary embodiment of a word comparator based on the inventive concepts discussed herein, employing a three-phase clock for additional power savings and also showing the word segmented so that the word's LSBs and MSBs be compared using different compare nodes.
Figure 4B:
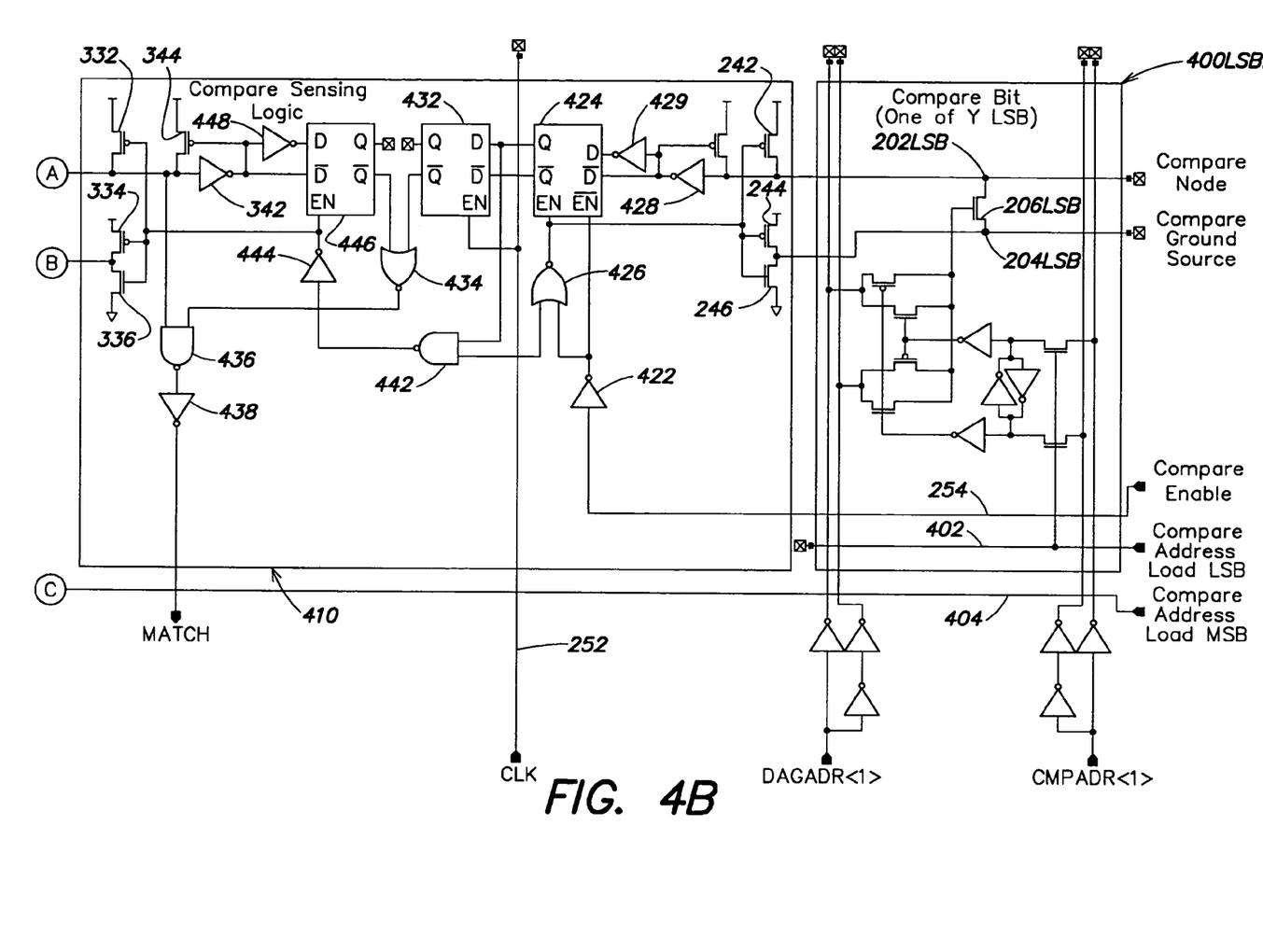

FIG. 4 illustrates an example of an embodiment of a circuit for practicing this aspect of the invention. The bit comparators 400LSBx and 400MSBy are identical to bit comparators 200LSBx and 200MSBy of FIG. 3, respectively, with one exception. Instead of all bit comparators receiving the same COMPARE ADDRESS LOAD signal (LDCMP) at line 122, the LSB comparators 400LSBx receive a COMPARE ADDRESS LOAD LSB signal on line 402 and the MSB comparators 400MSBy receive a COMPARE ADDRESS LOAD MSB signal on line 404. Each of the COMPARE ADDRESS LOAD signals is provided by external sources at appropriate times, to control bit (word) loading during the correct clock phases. The COMPARE ADDRESS LOAD MSB signal on line 404 is provided one phase after the COMPARE ADDRESS LOAD LSB signal on line 402. (Similarly, although not expressly indicated, the bits to be compared must be provided at corresponding times so that proper values can be strobed into the latches of the bit comparators.) The Comparison Sensing Logic 410, however, is quite different than the corresponding logic 310 of FIG. 3 because it has to implement the function of allowing the MSB compare node to discharge only after it is established that there was a complete match for the LSBs.

When the COMPARE ENABLE signal on line 254 is high, the activity that follows depends on the CLK signal, as before. When the CLK signal falls from high to low, the output of NOR gate 426 transitions from low to high and turns on transistor 246 and turns off transistors 242 and 244. This leaves node 202 pre-charged and discharges node 204. Latch 424 samples the complement of the value of the LSB compare node 202LSB, through inverter 428, while the CLK signal is low (the latch is transparent when its EN input is high and is closed when its EN input is low, so it samples while the EN input is high or the CLK signal is low). (Inverter 429 merely provides a complementary/differential input to a complementary input terminal of latch 424.) The output of inverter 422 is low, putting a low value on the disable (DIS) or reset input of latch 424. The output of the inverter 422 also supplies one input of the two-input NOR gate 426, the other input of which receives the clock (CLK) signal. Thus, latch 424 is enabled when the CLK signal is low (and the COMPARE ENABLE signal is high).

Latch 432 receives as input the output of latch 424, which indicates whether there was a match or mismatch condition on LSB compare node 202LSB (though recall that it is the complement of the state of node 202LSB). Latch 432 is enabled by the CLK signal and provides at its output a delayed version of the output of latch 424, to one input of NOR gate 434. The output of NOR gate 434 is supplied to one input of a two-input NAND gate 436 and via inverter 438 generates the MATCH signal when the other input of NAND gate 436 is high. The latch 432 connection to NOR gate 434 serves to prevent the MATCH signal from being asserted true if either the compare of the LSB resulted in a mismatch, or if the compare operation is disabled by the COMPARE ENABLE signal.

The remaining elements of comparison sensing logic 410 charge the MSB nodes 202MSB and 204MSB, sense the MSB compare node, prevent unnecessary discharging of the MSB compare node and assure that a false MATCH signal is not generated.

To these ends, the gates of transistors 332, 334 and 336 are driven through a NAND gate 442 and an inverter 444. One input of NAND gate 442 receives the CLK signal and the other input receives the true output of latch 424. So, when a mismatch is sensed on LSB compare node 202LSB, the output of latch 424 overrides the CLK signal and prevents the output of inverter 444 from discharging node 204MSB. Thus, the MSB compare bit node 202MSB cannot discharge.

If the LSBs match, it is necessary both to evaluate the MSBs and to hold the evaluation (i.e., state of the MSB compare node 202MSB) through the next clock phase. NAND gate 436 has one input connected to node 202MSB and rapidly communicates any mismatch to the MATCH signal output from inverter 438. To hold the state of the MSB compare node so it does not change prematurely, latch 446 is provided. The output of inverter 444 is driven high when NAND gate 442 receives the CLK signal (when a MSB compare is required), as a result of which latch 446 opens, supplying at the output of latch 446, to the second input of NOR gate 434, a signal that is a slightly delayed complement (via inverter 342 and inverter 448) of the signal on node 202MSB. As the output of NOR gate 434 is connected to a second input of NAND gate 436, it serves to maintain the state of the MATCH signal output during the precharge phase of the MSB compare node 202MSB, since latch 446 is closed during this time holding a sampled state of the compare node. (Pull-up transistor 344 charges node 202MSB in response to the output of inverter 342.)

Thus, NOR gate 434 pulls the MATCH signal low if there is either an LSB mismatch or the compare is disabled by the COMPARE ENABLE signal by way of NOR gate 434s connection to latch 432, and extends the influence that node 202MSB has on the MATCH signal during the compare phase by way of NAND gate 436 throughout the subsequent precharge phase of node 202MSB by way of the connection of NOR gate 434 to latch 446.

If it is desired to divide words into more than two segments for comparison, the embodiments of FIGS. 3 and 4 both lend themselves to greater than two segments. In FIG. 3, the NAND functions of NAND gates 272 and 272 need only be extended to include additional inputs to accept a greater number of segments, with each new segment having compare node and compare ground node conditioning similar to that previously described (consisting of the four transistors and one inverter connected to these nodes in the compare sensing logic, with these devices also having a stimulus similar to the previous segments discussed). In an extension of the embodiment illustrated in FIG. 4, each new segment added could consist of all devices in FIG. 4, except those including and relating to the generation of the outputs of latch 424. Each new segment would be connected to a previous segment by connecting the output of the previous segment's MATCH signal to the new segment's latch 432 input (which was cut due to the removal of latch 424 and related circuitry), while maintaining the required "true/false" match polarity of this connection as previously described for latch 432. Further note that only the final segment's MATCH output would represent an overall match for all segments, and address delivery and clock input phase (i.e., the CLK input to NAND 442) would need to be alternated for each added section, similarly to that which has been described between a first and second segment.

Figure 5:
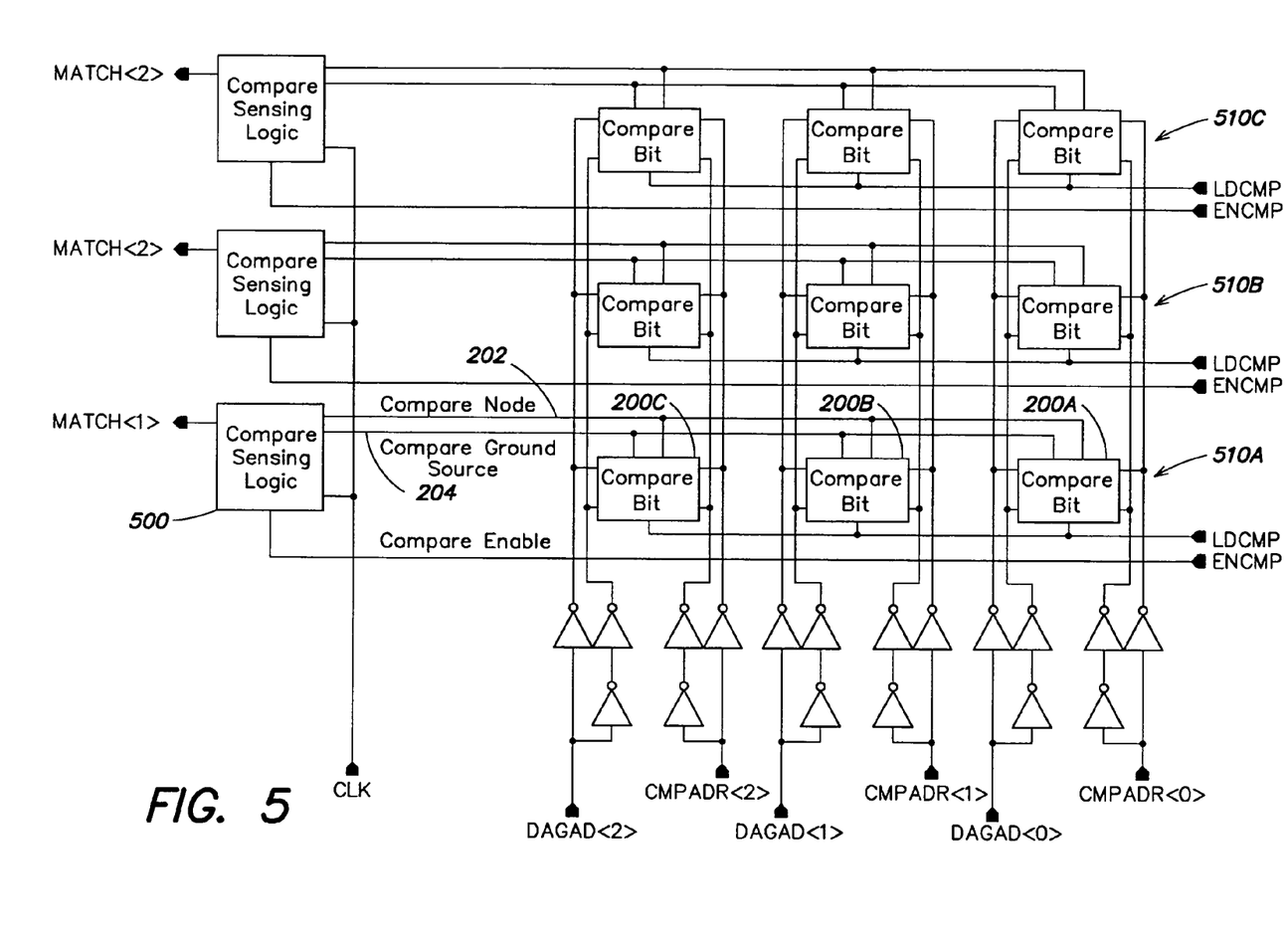
FIG. 5 is a block diagram of an example of using a word comparator as taught herein, in an array.

FIG. 5 shows how multiple bits in multiple words may be compared according to the invention. Each of bit comparators 200x (e.g., 200A, 200B, 200C, etc.) is one of the bit comparators 200 of FIG. 2. It will be observed that for the row formed by bit comparators 200A-200C, which compare three bits of a first word CMPADR with a corresponding three bits of a second word DAGAD, the bit comparators 200A-200C share a common compare node 202 and a common compare ground source node 204. As explained previously, comparison sensing logic 500 evaluates the compare node and provides a MATCH output for the row, indicated as row <1>. The comparison sensing logic may be any of the alternative designs shown above as in FIGS. 2-4 at 210, 310 or 410, or their equivalents. FIG. 5 does not show a segmented word comparison, but those skilled in the art will readily appreciate that the array may be extended to implement such approaches, consistent with the segmentation architecutes discussed above. If segmented comparison is employed, obviously the relevant additional inputs would have to be added to the diagram of FIG. 5, for strobing the data into the latches of the bit comparators, etc.

The rows 510A-C in FIG. 5 are all the same in structure and operation.

Having thus described several aspects of multiple embodiments of this invention, it is to be appreciated various alterations, modifications, and improvements will readily occur to those skilled in the art.

For example, although a single transistor has been shown for switch 206, it is not intended to exclude use, in addition, of non-switch related transistors which manage non-logical issues, such as "node stabilization" or "hot electron reducing," or "yield enhancing" devices. Other kinds of switching elements might be substituted in the future, as well, so long as the function of switch 206 is fulfilled—i.e., to discharge the compare node (typically to the compare ground source node) based on control input.

Actually, it is not even required that switch 206 pass charge. Rather, it is satisfactory if the impedance between the compare node and the compare ground source node is modified to a degree sufficient to be sensed by the comparison sensing logic.

As a further variation, although it is illustrated that the compare node is pre-charged and the comparison sensing logic senses a discharge, this operation could be inverted. That is, the compare node could be "pre-charged" to ground and "discharged" to the supply, or for that matter pre-charged and discharged to any two appropriate voltages. Potentially it is possible to sense for many different voltages so further information can be acquired from the bits being compared. For example, the voltage on the compare node (or impedance between the compare and compare ground source nodes) might be used to indicate how many bits mismatch if they all had an equal weight. It will be appreciated that there are potentially many derivatives along this line of thinking.

Moreover, although the logic in the examples is geared toward using an X-OR function to identify bit mismatches, one could reverse the premise of the logic and use an exclusive-NOR (X-NOR), instead, to identify matches instead of mismatches.

Accordingly, the invention is not intended to be limited to the disclosed embodiments but is, rather, intended to be limited only as required by the following claims and their equivalents.

What is claimed is:

1. An electronic, binary word comparator for use in digital computing environments for comparing digital words and having a plurality of bit comparators and comparison sensing logic, for comparing, bit-wise, the values of a plurality of first bits of a first word with the values of corresponding second bits of a second word, comprising:
   a. each bit comparator including
      i. a first node and a second node and a switch connected between the first and second nodes, said switch being responsive to a bit mismatch control signal, and
      ii. an exclusive-OR circuit connected to receive the first bit and a corresponding second bit of the second word as inputs and having an output generating the bit mismatch control signal which selectively actuates the switch when the values of the first and second bits are mismatched; and
   b. the comparison sensing logic including
      i. a first node pre-charging circuit,
      ii. a second node pre-charging circuit and a second node discharging circuit operative to discharge the second node after the first and second nodes have been pre-charged, and
      iii. a logic circuit connected to sense a state of the first node to signal a bit mismatch if the bit mismatch control signal has been generated and the switch has been actuated and discharged the first node, after receiving a signal enabling operation of the logic circuit.

2. The word comparator of claim 1 wherein the switch comprises a single transistor to effect a detectable change to the first node indicative of a bit mismatch.

3. The word comparator of claim 1 further comprising the first nodes of each of the bit comparators being a same node and the second nodes of each of the bit comparators being another same node.

4. A segmented electronic binary word comparator having a first set of bit comparators, a second set of bit comparators and comparison sensing logic, for comparing, bit-wise, the values of bits in the first set and, if all the bits in the first set match, then comparing, bit-wise, the values of bits in the second set, comprising:
   a. each bit comparator including
      i. a first node and a second node and a switch connected between the first and second nodes, said switch being responsive to a bit mismatch control signal, and
      ii. an exclusive-OR circuit connected to receive the first bit and a corresponding second bit of the second word as inputs and having an output generating the bit mismatch control signal which selectively actuates the switch when the values of the first and second bits are mismatched; and
   b. all of the first nodes of the first set of bit comparators being a first same node and all of the second nodes of the first set of bit comparators being a second same node, all of the first nodes of the second set of bit comparators being a third same node and all of the second nodes of the second set of bit comparators being a fourth same node;
   c. the comparison sensing logic including
      i. a first node pre-charging circuit for the first set of bit comparators,
      ii. a second node pre-charging circuit and a second node discharging circuit for the first set of bit comparators, operative to discharge the second node of the first set of bit comparators after the first and second nodes thereof have been pre-charged,
      iii. a first node pre-charging circuit for the second set of bit comparators,
      iv. a second node pre-charging circuit and a second node discharging circuit for the second set of bit comparators, operative to discharge the second node of the second set of bit comparators after the first and second nodes thereof have been pre-charged; and
   d. a comparison sensing logic circuit connected to sense a state of each of the first nodes to signal a bit mismatch if the bit mismatch control signal for either set of bits has been generated and the corresponding switch has been actuated and discharged a corresponding first node, after receiving a signal enabling operation of the logic circuit.

5. The word comparator of claim 4 wherein the comparison sensing logic includes circuitry which will not discharge the second node of the second set of bits and will not allow the first node of the second set of bits to be discharged until after circuitry in the comparison sensing logic signals that all bits of the first set of bits match.

6. A method of performing a high-speed, low-power bit-wise comparison of a first digital word with a second digital word, to generate a signal indicating when there is a match in value between all corresponding bits of said first and second digital words, comprising:
   a. pre-charging first and second nodes;
   b. discharging the second node;
   c. comparing the values of the bits of the first word with the values of corresponding bits of the second word;
   d. if a result of the comparing operation indicated that all bits do not match in value, discharging the first node to the second node; and
   e. sensing the first node to provide a signal in a first state if the first node is discharged and in a second state if the first node is not discharged.

* * * * *